Nov. 13, 1962

R. W. SAUMSIEGLE 3,063,890

APPARATUS FOR AND METHOD OF SEALING THERMOPLASTIC TUBES

Filed Nov. 16, 1959

INVENTOR.
Robert W. Saumsiegle
BY
Robert R. Churchill
ATTORNEY

Nov. 13, 1962 R. W. SAUMSIEGLE 3,063,890
APPARATUS FOR AND METHOD OF SEALING THERMOPLASTIC TUBES
Filed Nov. 16, 1959 7 Sheets-Sheet 3

INVENTOR.
Robert W. Saumsiegle
BY
Robert R. Churchill
ATTORNEY

Nov. 13, 1962   R. W. SAUMSIEGLE   3,063,890
APPARATUS FOR AND METHOD OF SEALING THERMOPLASTIC TUBES
Filed Nov. 16, 1959   7 Sheets-Sheet 5

INVENTOR.
Robert W. Saumsiegle
BY Robert R. Churchill
ATTORNEY

United States Patent Office 3,063,890
Patented Nov. 13, 1962

3,063,890
APPARATUS FOR AND METHOD OF SEALING THERMOPLASTIC TUBES
Robert W. Saumsiegle, Lexington, Mass., assignor to Pneumatic Scale Corporation, Limited, Quincy, Mass., a corporation of Massachusetts
Filed Nov. 16, 1959, Ser. No. 853,167
18 Claims. (Cl. 156—306)

This invention relates to apparatus for closing and sealing thermoplastic tubes.

The invention has for a principal object to provide novel and improved apparatus for closing and sealing the open ends of thermoplastic tubes in a rapid, efficient and economical manner.

A further object of the invention is to provide novel and improved apparatus for closing and sealing thermoplastic tubes having provision for simultaneously closing and sealing a plurality of thermoplastic tubes.

Another object of the invention is to provide novel and improved apparatus for closing and sealing tubes made of thermoplastic material wherein novel provision is made for setting the seal to provide smooth, uniform and attractive seals.

A still further object of the invention is to provide a novel and improved method of closing and sealing the open ends of thermoplastic tubes and for setting the seal to provide uniform and attractive seals.

With these general objects in view and such others as may hereinafter appear, the invention consists in the apparatus for and method of closing and sealing the open ends of thermoplastic tube containers and for setting the seals, and in the various structures, arrangements and combinations of parts hereinafter described and particularly defined in the claims at the end of this specification.

Figure 1:
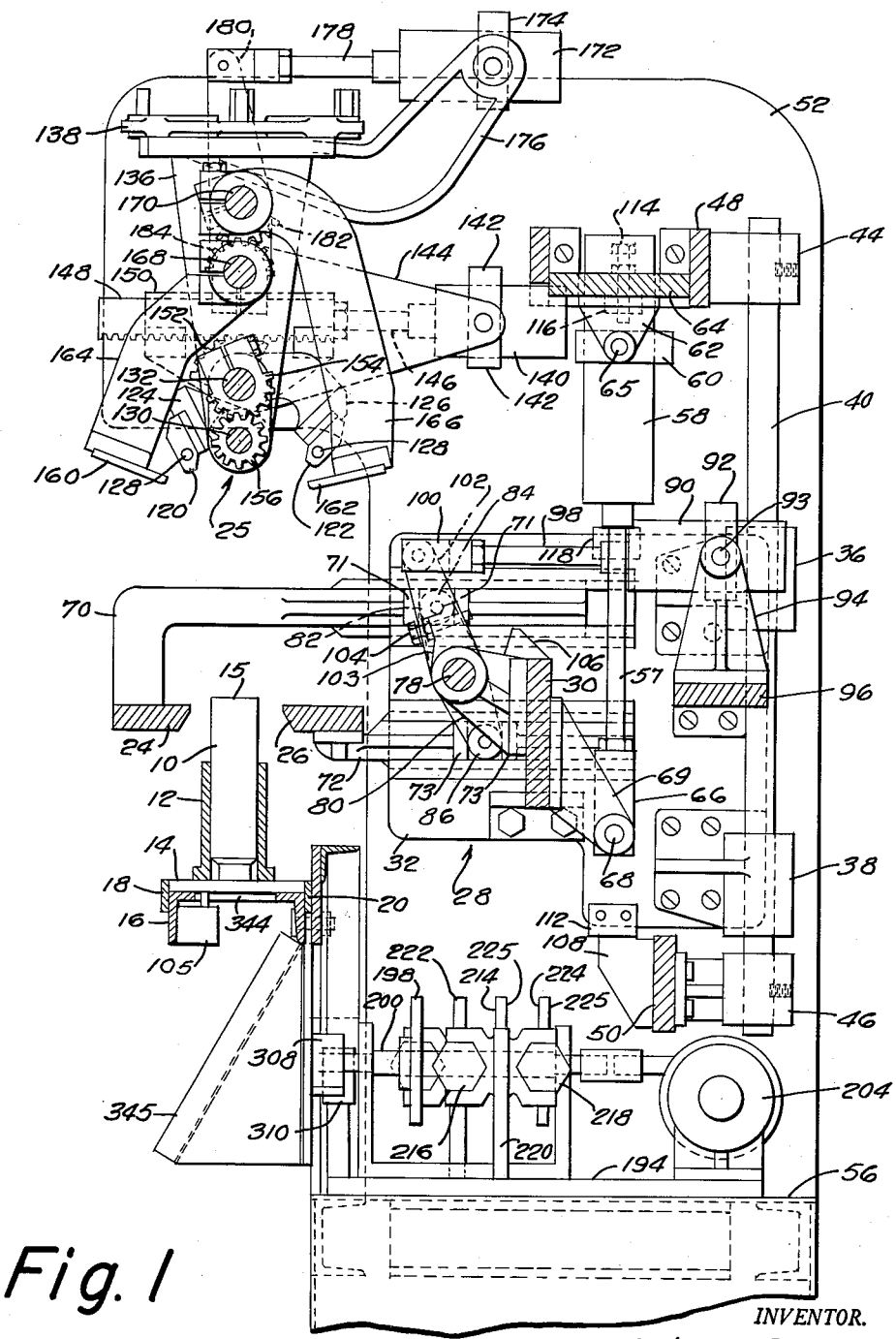
FIG. 1 is a side elevation in vertical cross section of apparatus embodying the present invention.

In general the present invention contemplates novel tube closing and sealing apparatus capable of rapidly and efficiently sealing the open ends of successive groups of filled tubular flexible thermoplastic containers and for setting each of the seals to provide a smooth, uniform and attractive seal for each container, thereby enhancing the appearance of the filled and sealed containers. Prior to the present invention it has been the practice to clamp the side walls of the open end of a tube made of a flexible thermoplastic material together and to subject the projecting two-ply edges of the tube thus clamped to radiant heat, such as to a glowing wire or to a flame, such as a gas burner flame, to render the edges molten to form a bead whereupon the molten bead was engaged between water cooled pressers or setting bars to effect the seal. While this practice has been successful in certain applications in sealing the open ends of thermoplastic tubes, the time involved in melting the thermoplastic material prior to the sealing operation and the high temperature to which the heating elements must be raised to sufficiently heat the atmosphere surrounding the ends of the tube to be sealed renders such practice rather slow and relatively expensive. Further, the molten bead formed in the heating operation must be subjected to pressure and cooled to provide an efficient, durable and leakproof seal.

In accordance with the preferred embodiment of the invention the end of the thermoplastic tube is clamped and flattened between clamping elements, and the flattened two-ply portion above the clamping elements is engaged by a pair of opposed rigid heat and pressure elements which are spaced above the clamping elements a distance at least equal to the thickness of a wall of the tube and are operative to soften the thermoplastic material sufficiently and press the opposed walls of the tube together to form a fused seal, the effective fused area of the seal being at least as great as the thickness of a wall of the tube.

In practice the heat and pressure as well as the duration of the heat sealing operation are controlled and regulated in a manner such as to maintain a predetermined contact pressure so that in operation as the resistance to the pressure of opposed sealing elements is reduced upon softening of the thermoplastic material the sealing elements will continue their movement toward each other a predetermined amount sufficient to complete the seal. Thereafter, when the fused material between the rigid sealing elements has been formed to a predetermined thickness the heat sealing elements are retracted. Before the fused thermoplastic material has had time to completely cool and set, the seal flange is engaged by opposed setting or shaping elements, similarly spaced above the clamping elements which may be maintained at room temperature, and which are also controlled and regulated to maintain a predetermined contact pressure against opposed sides of the seal flange for a predetermined time during initial cooling and setting of the thermoplastic material whereby to prevent the material in the area of the seal from wrinkling, warping or any other distortion during such initial cooling and setting period and to thereby produce a smooth, uniform, attractive straight line seal flange of predetermined and substantial thickness. The setting or shaping elements are then retracted, and the result is the rapid and economic production of an efficient sealed thermoplastic container. In practice the present apparatus is designed to simultaneously seal the ends of a plurality of tubes arranged in a group or bank, and provision is also made for varying the heat and pressure of the sealing elements and for varying the pressure of the setting or shaping elements to enable tubes formed of different types of flexible thermoplastic materials, such as polyethylene or polyvinylchloride to be economically and efficiently produced.

Referring now to the drawings, the thermoplastic tubes 10 to be provided with heat sealed end closures are supplied to the tube sealing apparatus in successive groups or banks and, as herein shown, the tubes are supported in spaced, vertical pockets 12 carried by a slide tray 14. Each of the tubes 10 have been previously closed at their lower ends with a conventional type of dispensing closure and have been filled with material prior to delivery to the sealing apparatus and are supported in the pockets 12 with their open ends 15 in an upright position. The tray 14 is arranged to be received in a horizontally extended stationary supporting platform 16 having side guides 18, 20 forming a slide track. The supporting platform 16 may be adjusted vertically by means indicated at 22 in FIG. 2 to accommodate tubes of different lengths. In operation the filled tray may be manually moved along the track to present the upper open ends 15 of the bank of tubes in operative position to be handled by the sealing apparatus.

As shown in FIG. 1, a bank of tubes is presented between opposed elongated gripping jaws 24, 26 which are arranged to be moved inwardly or toward each other to grip therebetween the upper open ends of the tubes and to bring the opposed walls of each tube together in a straight line, each forming two confronting plies of thermoplastic material. In practice the upwardly disposed end of each tube 10 is gripped at a point spaced a short distance below the top edge thereof so as to leave about one-eighth of an inch of the two-ply flattened end of the tube projecting upwardly above the upper surface of the gripping jaws 24, 26. The elongated gripping jaws 24, 26 are supported in and movable with an elevating unit indicated generally at 28, and in operation after the tubes are gripped between the gripping jaws 24, 26 the unit is elevated to withdraw the tubes from their pockets and to present the upwardly projecting ends thereof into operative relation to the heat sealing mechanism indicated generally at 25 whereupon the empty tray may be retracted to be filled with another bank of tubes to be sealed during a succeeding cycle of operation.

As herein illustrated, the elevating unit 28 includes a horizontally extended plate 30 shown in cross section in FIG. 1 which is connected at its ends to opposed side plates 32, 34. The side plates have attached thereto upper and lower slide bearings 36, 38, one on each side thereof, mounted to slide on vertical rods 40, 42. The vertical rods 40, 42 are secured to upper and lower supporting brackets 44, 46 attached to tie plates 48, 50, respectively, secured at their ends to the side frames 52, 54 of the apparatus. The side frames are mounted on the platen 56 as shown in FIG. 1.

In order to raise and lower the elevating unit to present the projecting portions of the gripped ends of the tubes into and out of operative relation to the sealing mechanism 25, the elevating unit is connected to the piston rod 57 of a vertically extended air cylinder 58 disposed in an intermediate position relative to the spaced vertical slide rods 40, 42. The air cylinder 58 is provided with a clamp collar 60 intermediate its ends and is pivotally supported in spaced bearing brackets 62 attached to and depending from a tie piece 64 extended between the side frames. The clamp collar is provided with opposed, laterally extended pins 65 which are received in the bearing brackets as shown. The piston rod 57 is connected at its lower end to a pivot block 66 mounted on a shaft 68 supported between spaced bearing brackets 69 attached to the longitudinally extended plate 30 of the elevating unit as shown.

In operation the air cylinder 58 is arranged to elevate the unit 28 after the tops or open ends of the tubes are gripped and flattened between the jaws 24, 26 and, as herein shown, one jaw 24, comprising the outer jaw, is carried between spaced arms 70 having a horizontally extended upper slide portion and a depending portion to which the jaw is attached. The inner jaw 26 is carried between spaced, horizontally extended slide arms 72. The arms 70 are mounted to slide in upper channels 74 formed on the inner faces of the opposed side plates 32, 34. The arms 72 are arranged to slide in lower channels 76 formed on the inner faces of the side plates. A rocker shaft 78 journaled in spaced brackets 80 attached to and extended from the plate 30 of the elevating unit is provided at each end with a two-arm operating lever. One arm 82 of the lever is provided with a roller 84 which is received between spaced projections 71 of the arm 70 carrying the outer jaw 24, and the other arm 86 of the lever is provided with a similar roller which is received between spaced projections 73 of the arm 72. Thus, in operation when the shaft 78 is rocked in one direction the jaws are brought together in gripping engagement with the upper ends of the tubes, and when rocked in the other direction the jaws are retracted to release the tubes.

As herein shown, the shaft 78 is arranged to be rocked by connections to a horizontally extended air cylinder 90 carried by and movable with the elevating unit 28. The air cylinder 90 is provided with a clamp block 92 intermediate its ends having opposed, laterally extended pivot studs 93 received in spaced bearing brackets 94 attached to a tie plate 96 extending between and secured to opposed side plates 32, 34 of the elevating unit. The free end of the piston rod 98 of the air cylinder 90 is connected by a link 100 to a lever 102 keyed to the rocker shaft 78. The hub of the lever 102 is provided with a boss 103 which carries an adjustable stop screw 104. The stop screw 104 is arranged to cooperate with a stop block 106 attached to and extended from the plate 30 to limit the amount of closing movement and gripping pressure of the jaws 24, 26 against the side walls of the tubes. While a firm gripping pressure is applied to maintain the tubes between the jaws, the amount of gripping pressure is limited in a manner such as to prevent undue compression and distortion of the resilient thermoplastic material supported between the gripping jaws.

From the description thus far it will be seen that a bank of thermoplastic tubes is delivered to the heat sealing apparatus such as to present the open ends of the tubes between the open gripping jaws 24, 26, and the jaws are then closed to grip and flatten the upper ends of the tubes. Thereafter, the thermoplastic tubes thus gripped with their flattened edges to be heat sealed projecting upwardly above the upper surface of the jaws are elevated to present the projecting edges into operative relation to the heat sealing mechanism 25. In operation when the tray 14 is moved into operative position to be handled by the sealing machine, the forward end thereof engages a stop switch indicated at 105 which forms part of a control circuit for initiating a cycle of operation of the machine, as will be hereinafter more fully described.

Figure 2:
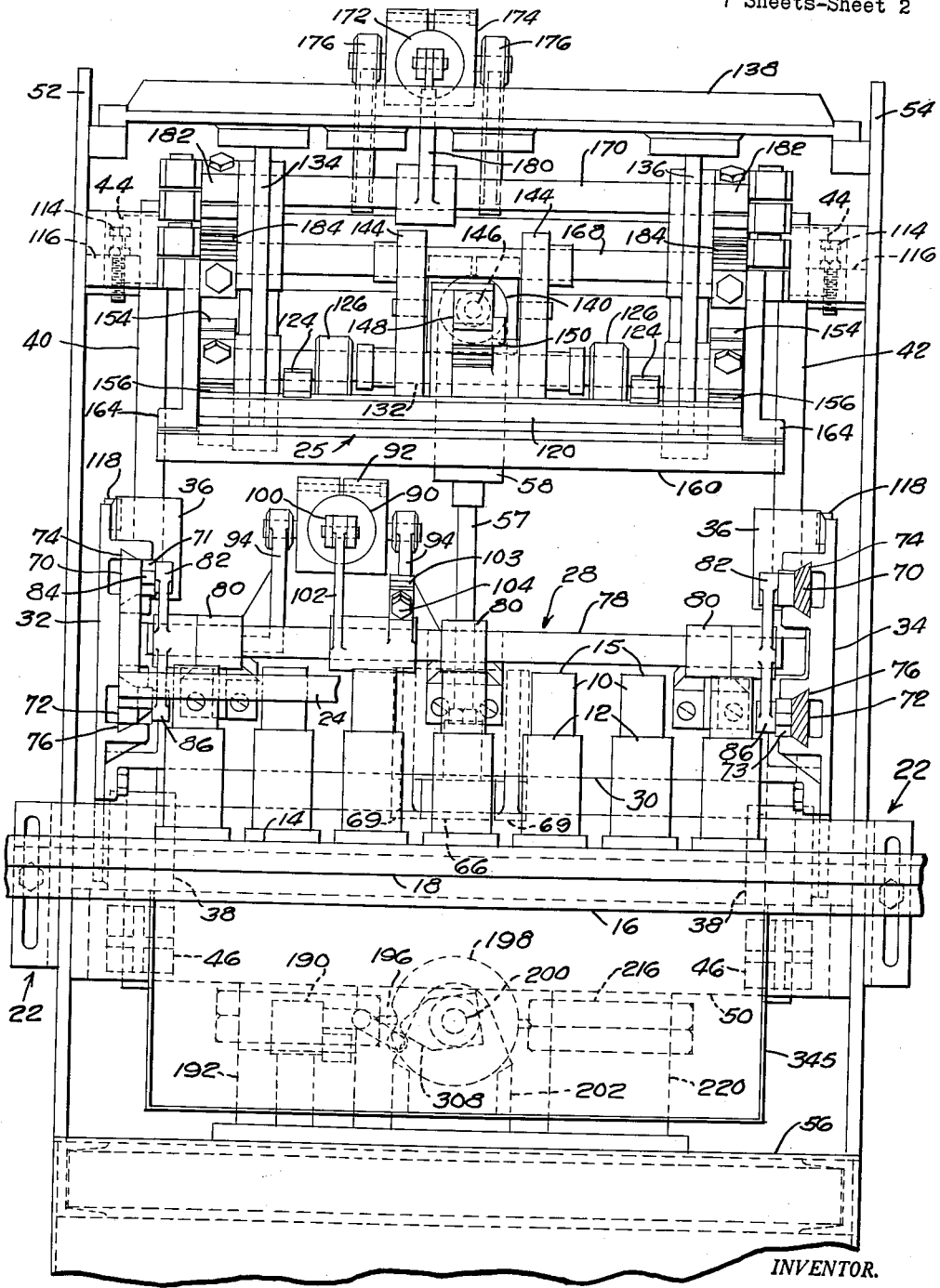
FIG. 2 is a front elevation of the same.

As indicated in FIGS. 1 and 2, the elevating unit is limited in its lowered position by lower stop members 108 extended from the plate 50 for cooperation with blocks 112 carried by the lower ends of the side plates 32, 34 whereby to present the gripping jaws in a position to grip the open ends of the tubes uniformly during successive cycles. Upper stop screws 114 carried by extensions 116 from the side frames cooperate with blocks 118 carried by the upper ends of the side plates to uniformly position and locate the upwardly projecting flattened ends of the tubes relative to the sealing mechanism.

The heat sealing mechanism indicated at 25 includes a pair of opposed elongated and rigid heat sealing and pressure applying jaws 120, 122 secured to spaced rocker arms 124, 126, respectively, and which are arranged to be rocked into contacting engagement with opposed sides of the two-ply upwardly projecting portions of the bank of tubes gripped and supported by the gripping jaws 24, 26. Each heat sealing jaw 120, 122 may be provided with elongated tubular electrical heating elements 128 extending therethrough which may be of the resistance type, such as the commercially available heating elements referred to as "Calrod" heating elements. While resistance type heating elements are preferred, other types of commercially available heating elements may be utilized. The heating elements may also be calibrated in a manner such as to assure uniform heating of the sealing jaws along their entire length. The sealing jaws may also be provided with a covering of any suitable commercially available anti-stick material, such as "Teflon," to prevent sticking of the thermoplastic tube material to the contacting surfaces of the sealing jaws during the heat sealing operation.

In operation the heat sealing jaws 120, 122 effect the application of heat and pressure to the projecting end portions of the tubular container to soften the material sufficiently to fuse the two plies of thermoplastic material together to form a complete seal, including a flange portion 121 and a fused effective seal area 123 having a radius at least equal to the thickness of one wall of the tube, and in practice the heat and pressure may be regulated to accommodate different thermoplastic materials, and the pressure may also be regulated in a manner such that as the resistance to the pressure of the jaws against the two-ply thickness is reduced by the progressive softening of the thermoplastic tube material the sealing jaws 120, 122 move to maintain a predetermined pressure contact against the thermoplastic material to assure coalescence and fusing of opposed plies and the formation of a complete uniform seal.

The spaced arms 124, 126 carrying opposed heat sealing and pressure applying jaws are mounted on rocker shafts 130, 132, respectively, which are journaled in spaced supporting brackets 134, 136 attached to and depending from a top tie frame 138 connected between the side frames 52, 54 as shown in FIG. 2. The shafts 130, 132 are arranged to be rocked to present the elongated heat sealing jaws into and out of engagement with the upwardly projecting ends of the tubes through connections including an air cylinder 140 supported intermediate its ends by a clamp collar 142 pivotally carried by spaced brackets 144. It will be observed that the clamp collar permits longitudinal adjustment of the air cylinder therein. The piston rod 146 of the air cylinder is connected to one end of a gear rack 148 supported for reciprocation in a slide bracket 150. The slide bracket 150 is mounted for pivotal movement on the shaft 132, and a gear segment 152 in mesh with the rack is keyed to the shaft 132. Each end of the rocker shaft 132 extending through and beyond the supporting brackets 134, 136 is provided with a gear segment 154 fast thereon and in mesh with gears 156 fast on the ends of the rocker shaft 130. The arms 124, 126 are clamped to their respective shafts 130, 132.

Figure 3:
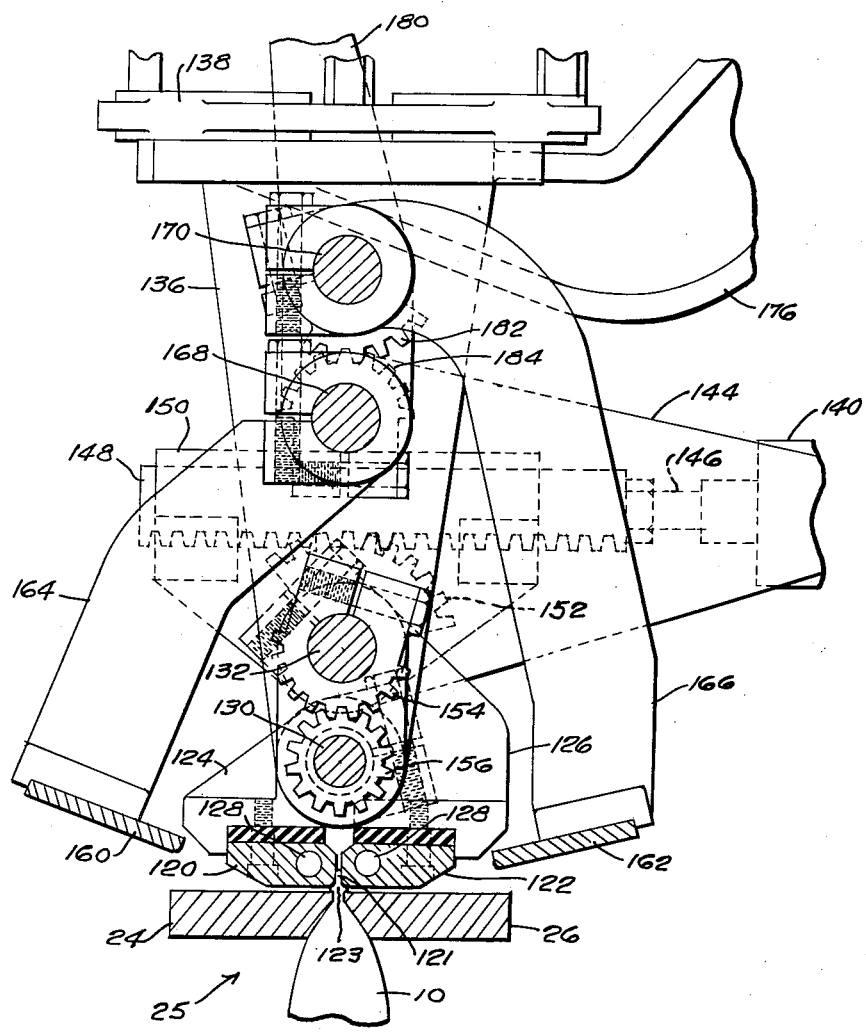
FIG. 3 is a detail view of the sealing and setting elements of FIG. 1 shown in sealing position.

In operation the air cylinder 140 which is of the double acting type is automatically controlled to rock the heat sealing jaws 120, 122 into contact with the upwardly projecting end portions of the tubes to be sealed as soon as the tubes are elevated into operative relation to the jaws, and after a predetermined and relatively short time during which a thermoplastic seal of predetermined thickness is produced the sealing jaws are retracted. As illustrated in detail in FIG. 3, when the jaws 120, 122 are brought into engagement with opposite sides of the portion of the end of the tube to be sealed the lower surfaces of the jaws are spaced above the upper surfaces of the gripping jaws 24, 26 a distance at least equal to the thickness of a wall of the tube, and the distance may be varied in accordance with the tube wall thickness. During the sealing operation the softened thermoplastic material may be squeezed by the sealing jaws to form a seal flange 121 having a thickness equal to about two-thirds or three-quarters of the initial two-ply thickness of the flattened tube end. The radius of the effective seal area 123 is maintained at least as great as the initial thickness of one ply of the tube material since this area is not pinched by the jaws. It will be observed that during the sealing operation portions of the softened material may expand into the space between the gripping jaws and the sealing jaws to provide laterally extended beads adjacent the seal area as shown.

Upon retraction or outward rocking of the sealing jaws 120, 122 a pair of setting or shaping jaws 160, 162, preferably at room temperature, are arranged to engage opposite sides of the end of the tube while it is still in a softened or semisoftened condition and to hold the seal flange in a straight line during initial cooling thereof whereby to prevent shrinking or wrinkling of the thermoplastic material as it is cooling. If desired, the engaging faces of the setting jaws 160, 162 may be provided with decorative surfaces, such as knurled surfaces, which are impressed in the material to enhance the appearance of the completed sealed tube. In practice the pressure applied to the seal flange by the setting jaws is pressure such that the thickness of the seal flange is formed by the sealing jaws remains the same and is not reduced during the setting operation.

Figure 4:
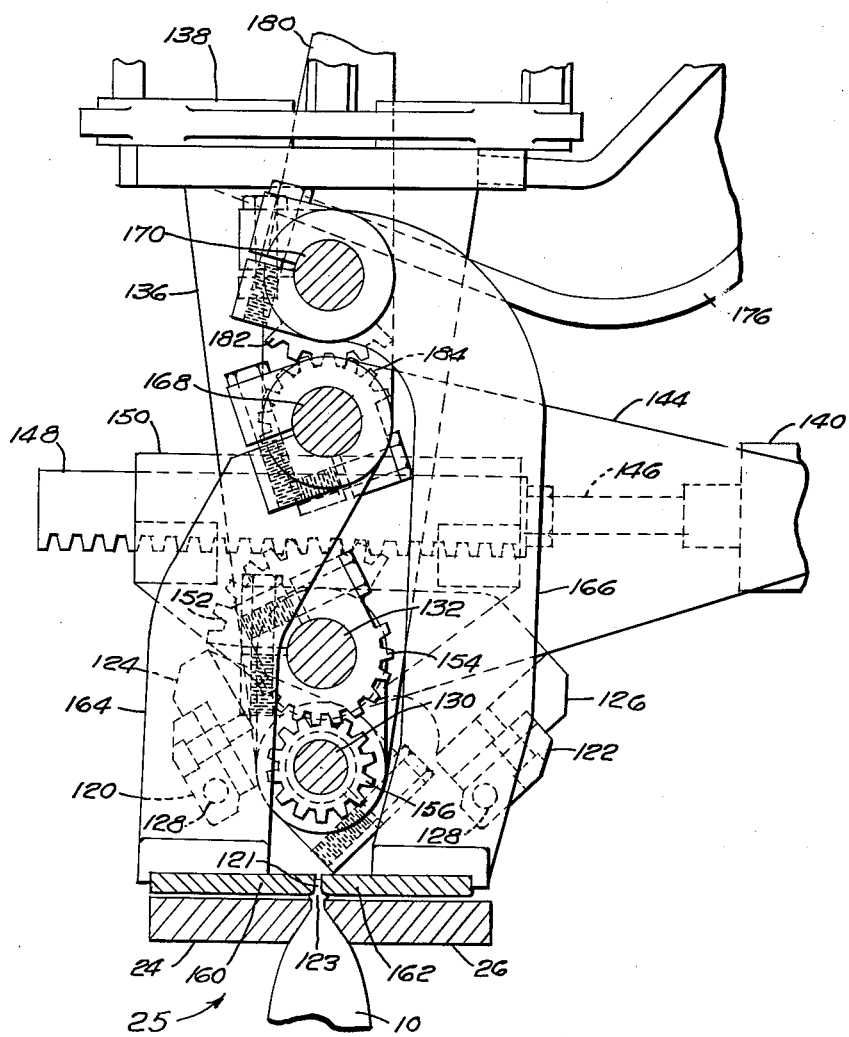
FIG. 4 is a view similar to FIG. 3 showing the sealing elements retracted and the setting elements in engagement with the seal.

As herein illustrated, the setting jaws 160, 162 are carried by arms 164, 166, respectively, the arms being clamped to the outer ends of a second set of rocker shafts 168, 170 also journaled in the brackets 134, 136. The shafts 168, 170 are arranged to be rocked to present the setting jaws into and out of engagement with the seal flange through connections including an air cylinder 172 supported by a clamp collar 174 pivotally carried by spaced brackets 176 attached to and extended from the underside of the top tie brackets 138. The piston rod 178 of the air cylinder 172 is connected to a lever 180 keyed to the upper shaft 170. Each end of the upper shaft 170 is also provided with a segmental gear 182 arranged to mesh with segmental gears 184 fast on the lower shaft 168. In operation the air cylinder 172 is automatically controlled to rock the setting jaws 160, 162 into contact with the seal as soon as the sealing jaws are retracted as illustrated in FIG. 4, and the setting jaws also assume a position wherein the lower face thereof is spaced above the upper face of the gripper jaws a distance at least equal to the thickness of the tube material. After a predetermined and relatively short time during which initial cooling and setting of the seal occurs, the setting jaws are retracted.

Figure 8:
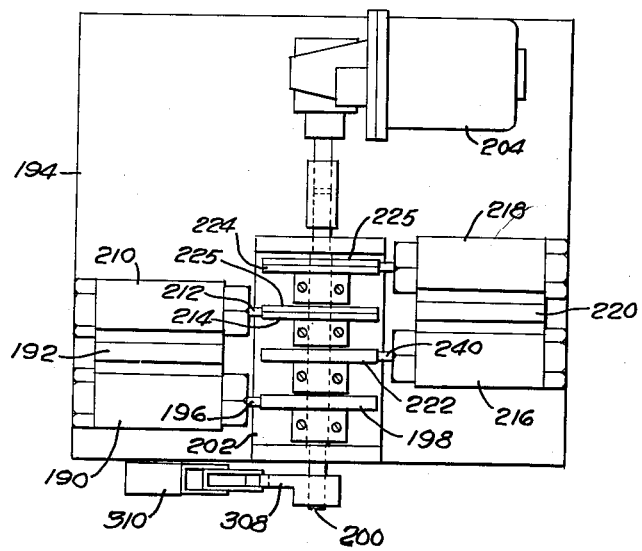
FIG. 8 is a plan view of the cam shaft and the cam operated valves by which the pneumatically actuated elements are controlled.
Figure 10:
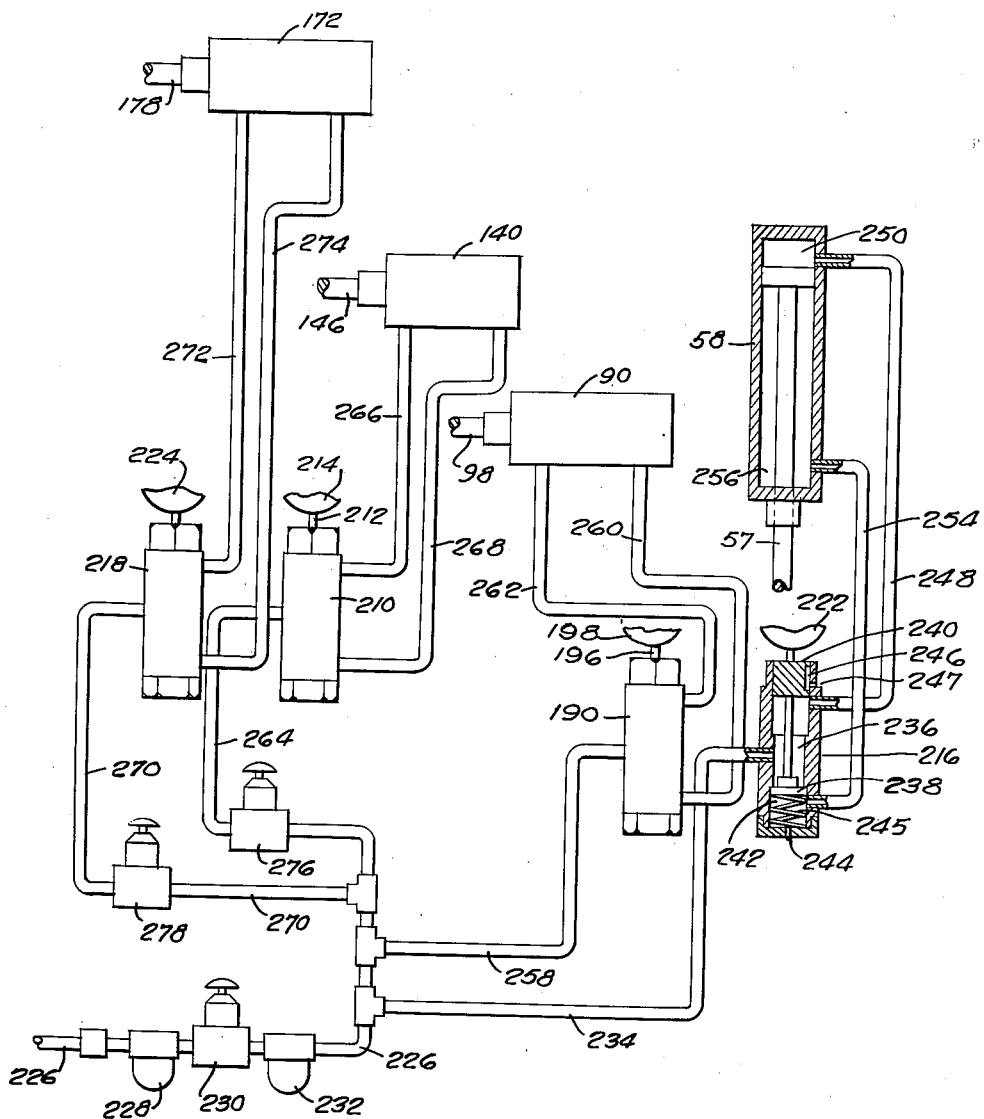
FIG. 10 is a diagrammatic view of the air cylinders and the pneumatic connections thereto.

Referring now to FIG. 8, the mechanism for controlling the operation of the air cylinders and for timing the operation thereof includes a plurality of cam operated valves which are included in a pneumatic control system diagrammatically illustrated in FIG. 10. As shown in FIG. 8, the cam operated valves include a gripping jaw control valve 190 mounted on one side of an upstanding plate 192 secured to a base 194 mounted on the platen 56. The valve 190 is provided with a spring pressed piston having a projecting head portion 196 arranged to cooperate with a cam 198 fast on a cam shaft 200. The cam shaft is journaled in spaced bearings formed in a bracket 202 attached to the base 194 and is arranged to be rotated by a speed reduction motor 204 as shown. A sealing jaw control valve 210 is mounted on the other side of the plate 192 and is provided with a spring pressed piston having a head portion 212 arranged to cooperate with a cam 214 also mounted on the cam shaft 200. Similar control valves comprising an elevating control valve 216 and a setting jaw control valve 218 are similarly supported on an upstanding plate 220 attached to the base 194 on the other side of the cam shaft and are also provided with spring pressed pistons having head portions for cooperation with their respective cams 222 and 224. The cams are preferably adjustably clamped to the cam shaft 200, and the cams 214 and 224 for controlling the duration of the sealing and setting operations, respectively, may each include a rotatably adjustable cam disk 225 for increasing or decreasing the time of the sealing and setting operations.

As diagrammatically illustrated in FIG. 10, the pneumatic control system comprises a main supply conduit 226 leading from a regulated source of supply of compressed air, not shown, and which is provided with a conventional filter 228, pressure regulator 230 and oiler 232. A flexible conduit 234 connected by suitable couplings from the supply conduit leads to the cam operated elevating control valve 216. The valve 216 provides a central chamber 236 between the piston 238 and the head 240; an end chamber 242 on the other side of the piston which is open to the atmosphere by an opening 244 in the end wall of the valve and which also contains the spring 245; and a vent chamber 246 formed in the head portion 240. The flexible conduit 234 is connected to supply compressed air to the central chamber 236, and a flexible conduit 248 is connected between the central chamber to the upper chamber 250 of the elevating cylinder 58.

In operation the control valve 216 is normally maintained in the position shown in FIG. 10 by the spring 245 with the head 240 bearing against its cam 222 so that the piston rod 57 is normally maintained in its lowered position. However, when the cam 222 effects inward movement of the head 240 and piston 238 the air in the upper chamber 250 of the elevating cylinder will be vented to the atmosphere through the chamber 246 and wall opening 247, and the central chamber pressure will be aligned with a flexible conduit connection 254 leading to the lower chamber 256 of the elevating cylinder to effect elevation of the elevator unit 28. As previously described, the lower and upper limits of movement of the elevator unit are controlled by stop members 108, 114.

The gripping jaw control valve 190 is similar in structure and mode of operation to the valve 216 and, as herein shown, is connected by a flexible conduit 258 from the supply conduit to the central chamber of the valve 190. The control valve 190 is also connected by flexible conduits 260, 262 to the chambers formed at each end of the gripping jaw cylinder 90. In operation the gripping jaws 24, 26 are normally maintained in a separated position, and when the cam 198 depresses the head portion 196 of the valve piston the gripping jaw cylinder 90 causes movement of the gripping jaws to effect gripping of the ends of the tubes in the manner described. Also, as previously described, the gripping movement is limited by a stop screw 104.

The sealing jaw control valve 210 and the setting jaw control valve 218 are similar in structure and mode of operation to the control valves above described. The control valve 210 is connected by a flexible conduit 264 to the main supply conduit and by flexible conduits 266, 268 to the sealing jaw cylinder 140. The setting jaw control valve 218 is connected by a flexible conduit 270 to the main supply conduit and by flexible conduits 272, 274 to the setting jaw operating cylinder 172. However, instead of providing definite stops for limiting the movement of the sealing jaws and the setting jaws into sealing and setting engagement with the ends of the tubes, provision is made for adjustably regulating the pressure and the time of contact with the seal flange to produce a seal of predetermined thickness. Thus, a second pressure regulator 276 is provided in the conduit 264 and the control valve 210, and a similar pressure regulator 278 is provided in the conduit 270 between the main supply conduit and the control valve 218. In practice the pressure in the main supply line is regulated by the primary regulator 230 to a pressure of about 80 p.s.i., and the full pressure is utilized to effect the gripping and elevating operations. The secondary regulators 276, 278 may be adjusted to regulate the pressure at about 40 p.s.i. The duration of the sealing and setting operations may be regulated by adjustment of the cam disks 225 provided for the sealing cam 214 and the setting cam 224.

Figure 11:
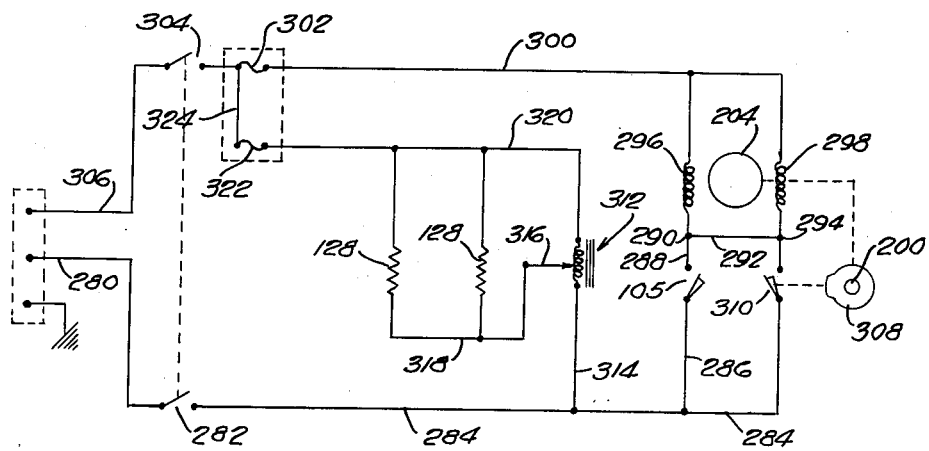
FIG. 11 is a wiring diagram.

A cycle of operation of the apparatus is initiated by movement of a filled tray 14 of thermoplastic containers along the track 16 into operative relation to the gripping jaws 24, 26 and to present the leading end of the tray into closing engagement with the normally open switch 105 mounted on the track 16. As illustrated in FIG. 11, the switch 105 forms part of a circuit to the motor 204. The circuit comprises a main line lead 280 from an alternating current sixty cycle power source to a manually operated switch 282; leads 284, 286 from the switch 282 to the cycle initiating switch 105; and a lead 288 from the switch 105 to one terminal 290 of the motor 204. The terminal 290 is connected by a lead 292 to a second motor terminal 294. The circuit is continued through the motor windings 296, 298 and by a return lead 300 to a fuse 302; manually operated switch 304 which is operated simultaneously with the switch 282; and main line lead 306.

As soon as the motor 204 is started a switch cam 308 fast on the cam shaft 200 operates to close a normally open holding switch 310 also in circuit with the lead 284 and the motor windings 296, 298. Thus, after the tubes 10 have been gripped and elevated from their holders 12 and the tray 14 has been retracted to permit the initiating switch 105 to open, the motor 204 will continue through its cycle of operation until the cam 308 effects opening of the switch 310 to terminate operation of the apparatus.

As also illustrated in FIG. 11, the electrical heating elements 128 are included in the circuit and are controlled by an adjustable thermostat 312. One terminal of the thermostat 312 is connected to the lead 284 by a lead 314, the current being continued through the operating arm 316 of the adjustable thermostat 312 and through the lead 318 to the heating elements 128. The other terminal of the thermostat is connected by a return lead 320 to which the heating elements are also connected. The circuit is completed through the fuse 322 and lead 324 to the switch 304 which is connected to the main line lead 306. Thus, in practice the temperature of the heat sealing jaws 120, 122 may be varied to suit the thermoplastic material being heat sealed and also to suit the regulatable pressure applied by the heat sealing jaws so that the combined action of the heat and pressure will produce a complete and leaktight seal in the ends of the thermoplastic tubes.

Figure 9:
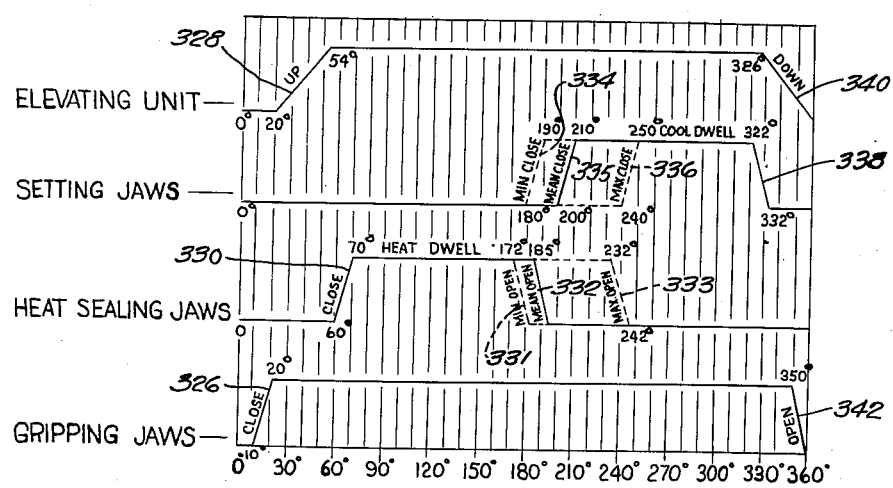
FIG. 9 is a cam chart indicating the sequence of operation during each cycle.

Referring now to the timing diagram shown in FIG. 9, it will be seen that the sequence of operations through 360° rotation of the cam shaft 200, which is initiated by starting of the motor upon closing of the switch 105, comprises first closing the gripping jaws as indicated by the line 326. As soon as the jaws have gripped the tubes the elevator unit starts its upward movement to present the projecting ends of the tubes into operative relation to the heat sealing jaws as indicated by the line 328. Directly thereafter, the heat sealing jaws are closed as indicated by the line 330. The time of dwell or duration of heat sealing contact is relatively short and is variable as indicated by the lines 331, 332, 333, whereupon the heat sealing jaws are rocked out of contact wth the seal. The setting jaws are then closed, and the time of such closing is variable, as indicated by the lines 334, 335, 336, to conform substantially to the opening time of the sealing jaws, the action being such that the setting jaws engage the softened seal flange immediately after the heat sealing jaws are disengaged. After a suitable and relatively short dwell of the setting jaws sufficient to shape and initially set the seal during initial cooling of the thermoplastic material, the setting jaws are rocked outwardly, as indicated by the line 338, and immediately thereafter the elevating unit is started on its descending movement as indicated by the line 340. During such descending movement of the elevating unit, the gripping jaws are retracted, as indicated by the line 342, to release the sealed tubes which may fall by gravity through an opening 344 in the supporting track 16 and onto a chute 345 to be discharged from the apparatus.

In the illustrated embodiment of the apparatus the cam shaft 200 is arranged to be rotated through the reducing gear motor 204 and may be rotated at a predetermined speed so that each cycle of operation may be completed within a predetermined time interval. In practice the heat sealing control cam 214 may be adjusted to retain the sealing jaws in sealing engagement with the tube end for any desired period of time, depending upon the type of thermoplastic material being sealed. The temperature of the sealing and pressure applying jaws 120, 122 may also be varied through adjustment of the thermostat 312, to produce a heat sealing temperature of between 200° and 600° F., depending on the type of thermoplastic material to be sealed. Another factor in the heat sealing operation comprises the amount of pressure applied by the sealing jaws which may be varied and is preferably maintained at 40 p.s.i.

As a result of the controlled heat and pressure applied to the end of the thermoplastic tube the material is rendered sufficiently softened to produce a completely fused seal in a minimum of time, thus affording greater production capacity as compared with the relatively longer time required by the radiant heat method.

Figure 5:
FIG. 5 is a detail view in vertical cross section of the seal as produced by the sealing elements.

It may be observed that the seal formed by the present apparatus, as illustrated in detail in FIG. 5, includes a smooth, regular flange portion 121 which has been formed, fused and set by the engagement of the sealing and setting jaws 120, 122 and 160, 162, respectively, and an effective seal area 123 having a radius, shown in dotted lines, at least equal to the thickness of a wall of the tube or containers.

Figure 6:
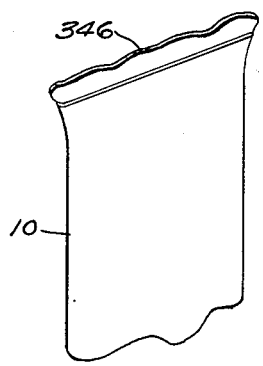
FIG. 6 is a perspective view of the sealed end as it would appear if permitted to cool without subjecting the seal to a setting operation.
Figure 7:
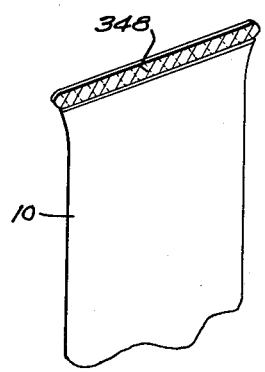
FIG. 7 is a perspective view of the seal after being subjected to a setting operation.

FIG. 6 illustrates a seal permitted to cool without subjecting the seal to a setting or forming operation, the seal being wrinkled and unsightly as indicated at 346. As illustrated in FIG. 7, the completed seal is provided with knurled impressions, as indicated at 348, produced by setting jaws having a knurled face.

In a modified form of the invention the lower surfaces of the heat applying and setting jaws 120, 122 and 160, 162 may be substantially flush with the upper surfaces of the gripping jaws 24, 26 during the heat sealing and setting operations, and the opposed lower marginal edges of the material engaging faces of the jaws 120, 122 and 160, 162 may be rounded or shaped such that when the jaws are rocked into engagement with the flattened end of the container held by the gripping jaws 24, 26 during the heating and setting operations, as hereintofore described, the thermoplastic material may be softened and molded to provide a seal having a fused area as defined by the shaped portions of the jaws at least equal in thickness to the thickness of a wall of the container.

While in the preferred embodiment of the invention the heat applying and the setting jaws are spaced above the gripping jaws a distance equal to at least the thickness of a wall of the container, in some instances the spacing may be less than the thickness of the container wall.

From the above description it will be seen that the present apparatus is capable of producing an efficient, strong, leakproof thermoplastic seal of predetermined shape and thickness in a rapid and economical manner, and that it is within the contemplation of the present invention that the present apparatus may be utilized to seal other types of thermoplastic containers, such as flat bags and the like.

While the preferred embodiment of the invention has been herein illustrated and described, it will be understood that the invention may be embodied in other forms within the scope of the following claims.

Having thus described the invention, what is claimed is:

1. Apparatus for closing and sealing the open end of a thermoplastic tube comprising means for gripping the open end of the tube at a point a short distance below the end to bring opposed walls of the tube together and to form a two-ply projecting end portion, heat and pressure applying means directly engageable with opposed sides of the projecting end portion and arranged to soften and fuse the opposed walls by conduction and to form a leaktight seal having a laterally extended bead adjacent its lower end, and setting means for thereafter engaging and applying pressure to opposed sides of the softened seal above the bead to set and shape and form the seal during the initial cooling of the thermoplastic material.

2. Apparatus for closing and sealing the open end of a thermoplastic tube comprising means for gripping the open end of the tube at a point a short distance below the end to bring opposed walls of the tube together and to form a two-ply projecting end portion, contact type heat and pressure applying means directly engageable with opposed sides of the projecting end portion and arranged to soften and fuse the opposed walls by conduction and to form a leaktight seal having a laterally extended bead formed between said gripping means and said sealing means, setting means for thereafter engaging and applying pressure to opposed sides of the softened seal above the bead to set and shape the seal during the initial cooling of the thermoplastic material, and means for regulating the heat, pressure and duration of the sealing operation whereby to produce a seal of predetermined shape and thickness.

3. Apparatus for closing and sealing the open end of a thermoplastic tube comprising means for gripping the open end of the tube at a point a short distance below the end to bring opposed walls of the tube together and to form a two-ply projecting end portion, heat and pressure applying means engageable with opposed sides of the projecting end portion and arranged to soften and fuse the opposed walls and to form a leaktight seal, setting means for thereafter engaging and applying pressure to opposed sides of the softened seal to set and shape the seal during the initial cooling of the thermoplastic material, and means for regulating the heat, pressure and duration of the sealing operation whereby to produce a seal of predetermined shape and thickness, said heat and pressure applying means and the setting means comprising metal bars, the lower surfaces of said bars being spaced above the upper surfaces of the gripping means when in engagement with the tube providing a space therebetween into which portions of the softened material may expand whereby the effective seal area adjacent said space is at least as thick as the wall of the tube.

4. Apparatus for closing and sealing the open ends of a row of thermoplastic tubes comprising elongated gripping jaws operative to grip the tubes at a point a short distance below the ends to bring opposed walls of the tubes together to form two-ply projecting end portions, elongated rigid heat and pressure applying jaws directly engageable with opposed sides of the projecting end portions of the tubes and arranged to soften and fuse the opposed walls by conduction and to form leaktight seals, and elongated setting jaws operative to engage opposed sides of the softened seals after disengagement of the heat sealing jaws to set and shape the seals during the initial cooling period of the thermoplastic material, the upper surface of said gripping jaws being spaced from the lower surface of said heat and pressure applying jaws to provide a space therebetween into which the softened material may expand to form laterally extended beads.

5. Apparatus for closing and sealing the open ends of a row of thermoplastic tubes comprising gripping jaws operative to grip the tubes at a point a short distance below the ends to bring opposed walls of the tubes together to form two-ply projecting end portions, rigid heat and pressure applying jaws directly engageable with opposed sides of the projecting end portions arranged to soften and fuse the opposed walls by conduction and to form leaktight seals, means for operating said heat sealing and pressure applying jaws, means for regulating said heat sealing and pressure applying means in a manner such as to cause the jaws to continue their movement toward each other during softening of the thermoplastic material, and means for controlling the duration of the heat sealing and pressure applying operation for discontinuing the pressure and effecting retraction of the sealing jaws when the seal has been formed to a predetermined thickness, said gripping jaws and said heat applying jaws providing a space therebetween into which portions of the softened material may expand to form laterally extended beads.

6. Apparatus as defined in claim 5 wherein means is provided for supporting and aligning the row of tubes prior to engagement thereof by the gripping jaws.

7. Apparatus as defined in claim 5 which includes means for heating said sealing jaws, and means for regulating the temperature thereof.

8. Apparatus for closing and sealing the open ends of a row of thermoplastic tubes comprising gripping jaws operative to grip the tubes at a point a short distance below the ends to bring opposed walls of the tubes together to form two-ply projecting end portions, rigid heat and pressure applying jaws directly engageable with opposed sides of the projecting end portions arranged to soften and fuse the opposed walls by conduction and to form leaktight seals, means for operating said heat sealing and pressure applying jaws, means for regulating said operating means in a manner such as to cause the jaws to continue their movement toward each other during softening of the thermoplastic material, means for controlling the duration of the heat sealing and pressure applying operation for discontinuing the pressure and effecting retraction of the sealing jaws when a seal of a predetermined thickness has been formed, and setting jaws operative to engage opposed sides of the softened seals after disengagement of the sealing jaws to set and shape the seals during initial cooling of the thermoplastic material, said heat sealing jaws being curved at their lower engaging edges and engaging the projecting end portions a short distance above said gripping jaws to provide a space into which the softened material may expand to form laterally extended beads.

9. Apparatus as defined in claim 8 which includes a second means for operating said setting jaws, and a second regulating means for controlling the setting jaw operating means in a manner such as to maintain substantially the same thickness of the seal as effected during the sealing operation, said setting jaws also being curved at their lower engaging edges.

10. Apparatus as defined in claim 9 wherein the sealing and setting jaws are disposed above the row of thermoplastic tubes gripped by said gripping jaws, and means for elevating the gripping jaws to present the projecting end portions of the tubes into operative relation to said sealing and setting jaws.

11. In the method of producing a seal in the two-ply flattened end of a thermoplastic tube, the steps of gripping the flattened end a short distance below the end of the tube, applying heat and pressure to opposed sides of the two-ply end of the tube a short distance above the gripped portion to render the thermoplastic material soft and to form a bead between the gripped and heated portion and to fuse by conduction the two-ply end together to produce a leaktight seal while controlling the heat, pressure and duration of the sealing operation to produce a seal of predetermined thickness.

12. In the method of producing a seal in the two-ply flattened end of a thermoplastic tube, the steps of gripping the tube a short distance below the flattened end of the tube, applying heat and pressure to opposed sides of the two-ply end of the tube from a point a short distance above the gripped portion to render the thermoplastic material soft and to fuse by conduction the two-ply end together to produce a leaktight seal while controlling the heat, pressure and duration of the sealing operation to produce a seal of predetermined thickness and to permit flow of portions of the softened material between the gripped and heated portions to provide laterally extended beads, and immediately thereafter applying pressure to opposed sides of the seal for a predetermined time to set the seal during the initial cooling period whereby to prevent wrinkling of the thermoplastic material during the cooling period and to maintain the same thickness of the seal as effected during the sealing operation.

13. Apparatus for closing and sealing the open end of a thermoplastic tube comprising means for gripping and flattening opposed walls of a tube, means for heating by conduction and pressing the walls a short distance above the gripped portion to soften and fuse the walls and to form a completed seal of predetermined thickness having a laterally extended bead formed between the gripped and the heated portion, and setting means for thereafter engaging and pressing said softened walls to prevent wrinkling of the same while cooling and to maintain the thickness of the seal effected by said heating and pressing means.

14. Apparatus for closing and sealing the open end of a thermoplastic container comprising gripping means for flattening together the opposed walls of the container adjacent the open end thereof to form a flattened end portion and for supporting the container during the sealing operation, heat and pressure applying means adapted to directly engage the flattened end portion to soften and fuse the walls thereof by conduction and form a completed upstanding flange of predetermined thickness and an effective seal area, and setting means also engageable with said completed seal flange and seal area to maintain the shape and thickness of the same during initial cooling of the softened material and to prevent wrinkling of the same during cooling, said heat and pressure applying means and said setting means arranged to successively engage the same area of the flattened end portion, the material engaging faces of the heat applying and setting means being shaped to provide an effective seal area defined by a radius at least equal to the thickness of a wall of the container, said gripping means and said heating means being spaced to form a laterally extended bead adjacent the lower end of the seal area.

15. Apparatus as defined in claim 14 including means for controlling the heat and pressure applying means and said setting means to provide a seal flange having a thickness of from two-thirds to three-quarters of the initial thickness of the flattened end portion.

16. Apparatus as defined in claim 15 wherein the engaging faces of said heat and pressure applying jaws are curved at their lower edges.

17. Apparatus for closing and sealing the open end of a thermoplastic tube comprising gripping jaws operative to grip the tube at a point a short distance below the end to bring opposed walls of the tube together and to form a two-ply projecting end portion, thermostatically controlled heat and pressure applying jaws directly engageable with opposed sides of the projecting end portion arranged to soften and fuse the opposed walls by conduction and to form a completed leaktight seal of predetermined thickness, said gripping jaws and said heating jaws being spaced to form a laterally extended bead adjacent the lower end of said seal, pneumatically operated control means for producing a seal of said predetermined thickness comprising an air circuit, an air cylinder in the circuit for operating said heat sealing jaws, a cam operated valve associated with said air cylinder adjustable to vary the duration of the sealing operation, and a pressure regulator in said air circuit associated with said air cylinder, and setting jaws operative thereafter to engage opposed sides of the completed seal to maintain said predetermined thickness and to prevent wrinkling of the material during initial cooling.

18. Apparatus as defined in claim 17 wherein similar pneumatically operated control means is provided for said setting jaws to maintain said predetermined thickness.

References Cited in the file of this patent

UNITED STATES PATENTS

| 2,162,464 | Soderberg | June 13, 1939 |
| 2,691,474 | Olson | Oct. 12, 1954 |
| 2,926,474 | Morrison | Mar. 1, 1960 |
| 2,928,218 | Lecluyse | Mar. 15, 1960 |
| 2,955,643 | Shapero | Oct. 11, 1960 |